UNITED STATES PATENT OFFICE.

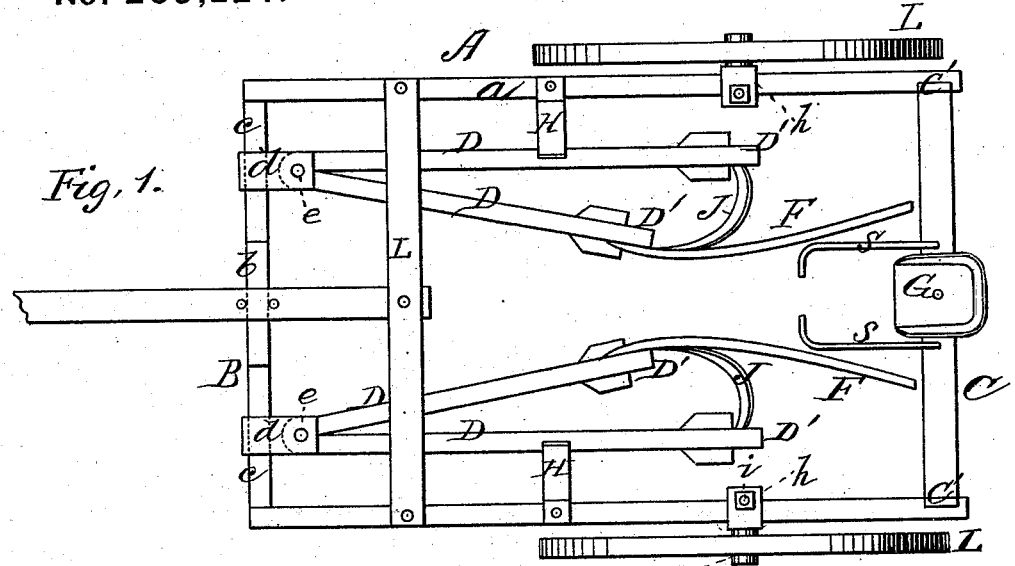
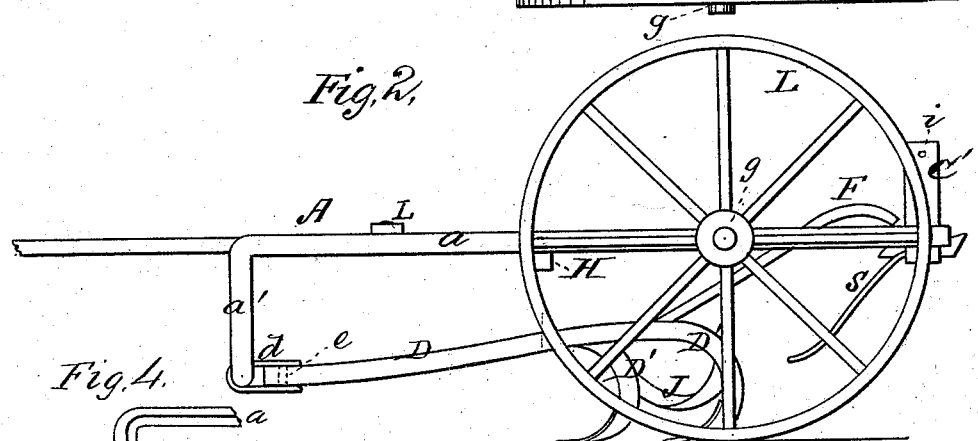
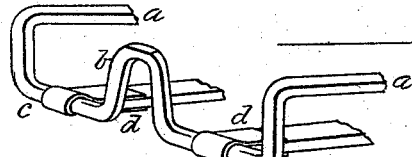
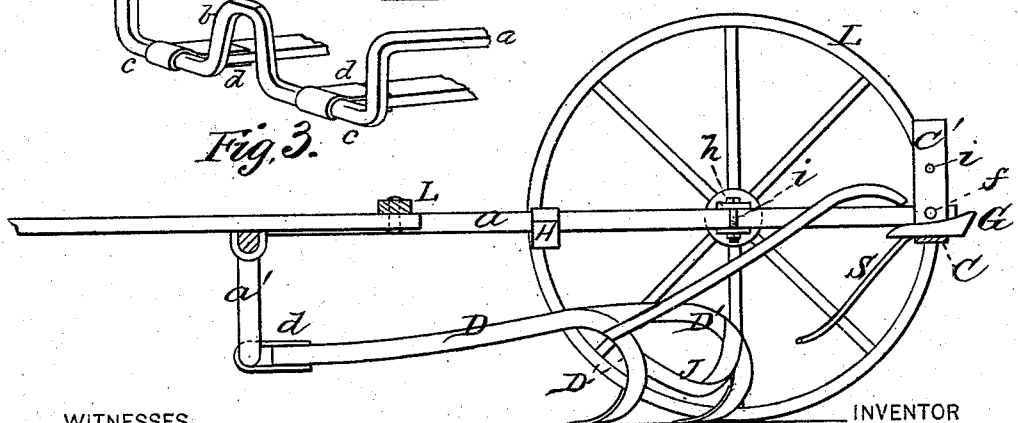

HUGH H. CANADAY, OF FAIRFIELD, IOWA.

IMPROVEMENT IN RIDING-CULTIVATORS.

Specification forming part of Letters Patent No. 209,224, dated October 22, 1878; application filed December 1, 1877.

*To all whom it may concern:*

Be it known that I, HUGH H. CANADAY, of Fairfield, in the county of Jefferson and State of Iowa, have invented a new and valuable Improvement in Riding-Cultivators; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a top view of my invention. Fig. 2 is a side view thereof. Fig. 3 is a longitudinal vertical section of the same, and Fig. 4 a detached perspective view of the front part of the frame of the cultivator.

This invention has relation to gang-plows; and it consists in the construction and novel arrangement of the frame, having the parallel side bars and the front bar bent downward on each side to receive the clevis-plates, and up in the middle to support the tongue, the adjustable rear-seat bar, the adjustable wheel-spindle clamps, and the stirrups connecting the plow-beams, all as hereinafter shown and described.

In the annexed drawings, the letter A designates the frame of my improved gang-plow, composed of the side bars, a, and the front and rear bars, B C. The front bar, B, is a component part of the frame, but is depressed below its level, being united to the side bars by means of the vertical portion a'. The bar B is arched at its middle portion, as shown at b, to allow the corn to pass under the frame without opposition, and at each side of the arch is rounded, as shown at c, to afford bearings for the U-shaped clevis-plates d, to which the front ends of the beams D of the plows are pivoted, so as to have free horizontal adjustment. The upward middle bend, b, also supports the tongue, the rear end of which is secured to the cross-bar L.

The beams D and standards D' of the plows are preferably formed in one piece, the one being shorter than the other, and they diverge from each other in the usual way. The said plows may be thrown to the right or left, in avoiding plants, upon their pivots e, or raised out of the ground through the medium of the handles F, rigidly secured to the plow-beams, and extending to the rear within convenient reach of the driver, carried upon a seat, G, centrally secured to the rear bar, C, of the frame.

In driving to or from the field, the gangs of plows are raised and the inside beam of each gang placed in a concave rest or support, H, projecting inward from the side rails of the frame, as shown in Fig. 1.

The rear ends of the beams D of each gang are connected by a stirrup-plate, J, in rear of the shovels, which not only braces the beams together, but also serves as a foot-rest for the driver, by means of which he is better able to control the plows when necessary. Under ordinary circumstances, however, his feet rest in the stirrups S, depending from the rear bar, C. This latter has at each end an extension, C', at right angles to it, and provided with spaced perforations $i$, registering with a similar perforation in the ends of the side bars of the frame. A clamp or other bolt, $f$, extends through these perforations, and enables the seat to be raised or lowered according to the height of the plants.

The frame is supported upon the transporting-wheels L, rotating upon the spindles $g$ of a clamp, $h$, that is adjustable to the front or rear, for the purpose of balancing the frame and its attachments.

The clamps are secured on the side bars, when adjusted, by a clamp-bolt, $i$, or other equivalent device.

What I claim as new, and desire to secure by Letters Patent, is—

In a wheel-plow, the frame A, having the horizontal side bars, a, extending from end to end, the front bar, B, bent downward at each side at a', and horizontally at c, to receive the clevises d, thence upward at the middle to form an arch, b, for the tongue, the adjustable wheel-clamps h on said bars, the rear bar, C, having the seat G, and the foot-rests J, connecting the rear ends of the plow-beams and depending therefrom in rear of the shovels, substantially as specified.

In testimony that I claim the above I have hereunto subscribed my name in the presence of two witnesses.

HUGH HENRY CANADAY.

Witnesses:
G. W. HENDERSON,
J. H. AIRS.